United States Patent [19]

Nonaka et al.

[11] Patent Number: 5,497,061
[45] Date of Patent: Mar. 5, 1996

[54] METHOD OF CONTROLLING ROBOT'S COMPLIANCE

[75] Inventors: Youichi Nonaka, Fujisawa; Shiyuki Sakaue, Hiratsuka, both of Japan

[73] Assignee: Hitachi, Ltd., Tokyo, Japan

[21] Appl. No.: 216,975

[22] Filed: Mar. 24, 1994

[30] Foreign Application Priority Data

Mar. 31, 1993 [JP] Japan ...................... 5-073343

[51] Int. Cl.⁶ .......................... G05B 19/42; G06F 15/46
[52] U.S. Cl. ...................... 318/568.11; 318/568.1; 318/568.22; 318/568.19; 395/95; 395/97; 901/34; 901/45
[58] Field of Search .................. 318/560–646; 901/3, 5, 7, 9, 12, 13, 15, 17, 45, 46; 395/80–99

[56] References Cited

U.S. PATENT DOCUMENTS

| | | | |
|---|---|---|---|
| 4,949,026 | 8/1990 | Mead | 318/649 |
| 4,999,553 | 3/1991 | Seraji | 318/561 |
| 5,023,808 | 6/1991 | Seraji | 901/34 |
| 5,056,038 | 10/1991 | Kuno et al. | 364/513 |
| 5,115,418 | 5/1992 | Shimada | 318/616 |
| 5,159,249 | 10/1992 | Megherbi | 318/568.1 |
| 5,179,514 | 1/1993 | Rastegar et al. | 395/97 |
| 5,193,963 | 3/1993 | McAffee et al. | 414/5 |
| 5,206,930 | 4/1993 | Ishikawa et al. | 395/95 |
| 5,220,261 | 6/1993 | Kempas | 318/567 |
| 5,224,032 | 6/1993 | Worn et al. | 364/167.01 |
| 5,239,248 | 8/1993 | Shimada et al. | 318/568.12 |
| 5,260,629 | 11/1993 | Ioi et al. | 318/568.19 |

FOREIGN PATENT DOCUMENTS 62-35915  2/1987  Japan.

OTHER PUBLICATIONS

Society of Instrument and Control Engineers, Collection of Paper vol. 22, No. 3, pp. 343–350 Mar. 1986, "Virtual Compliance Control of Multiple Degree of Freedom Robot".

*Primary Examiner*—Paul Ip
*Attorney, Agent, or Firm*—Antonelli, Terry, Stout & Kraus

[57] ABSTRACT

A control system in which an end effector of a robot is mechanically compliant for a particular object. The robot has multiple degrees of freedom and movement and includes a sensor which senses a velocity nd a sensor which senses an external force. A virtual compliance control method is applied to the robot. Influence of the weight and gyro moment of the end effector is subtracted from a value obtained from a mechanism which senses the external force to set a term of the external force in a mathematic model of the control system constructed during control. By such arrangement, when a rotational body having a mechanically large rotational momentum is set as the end effector of the robot, the control system is mechanically compliant with the object.

4 Claims, 4 Drawing Sheets

FIG. 3

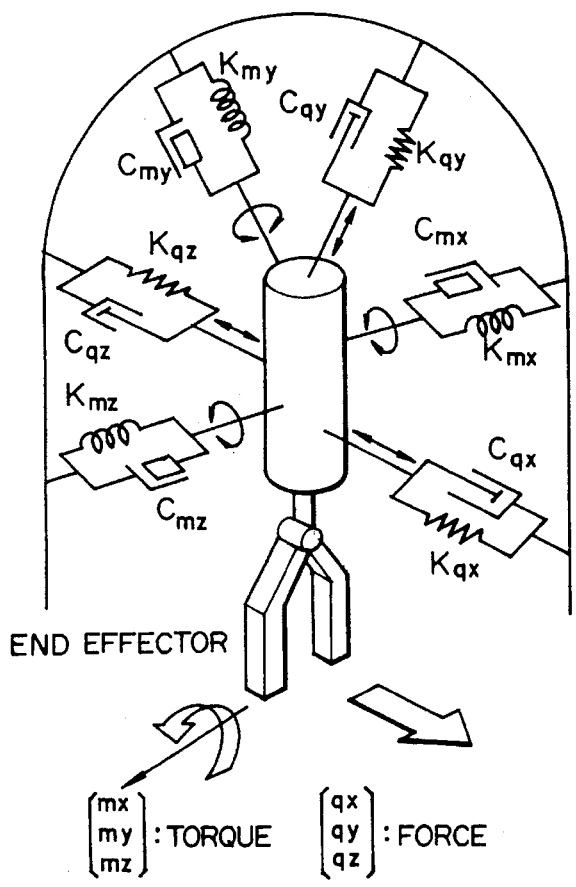

VIRTUAL MASS $$[M] = \begin{bmatrix} m_q & & & & & 0 \\ & m_q & & & & \\ & & m_q & & & \\ & & & m_m & & \\ & & & & m_m & \\ 0 & & & & & m_m \end{bmatrix}$$

VIRTUAL SPRING CONSTANT $$[K] = \begin{bmatrix} K_{qx} & & & & & 0 \\ & K_{qy} & & & & \\ & & K_{qz} & & & \\ & & & K_{mx} & & \\ & & & & K_{my} & \\ 0 & & & & & K_{mz} \end{bmatrix}$$

VIRTUAL VISCOUS COEFFICIENT $$[C] = \begin{bmatrix} C_{qx} & & & & & 0 \\ & C_{qy} & & & & \\ & & C_{qz} & & & \\ & & & C_{mx} & & \\ & & & & C_{my} & \\ 0 & & & & & C_{mz} \end{bmatrix}$$

EXTERNAL FORCE
$q = (q_x, q_y, q_z, m_x, m_y, m_z)^T$

END EFFECTOR $\begin{bmatrix} m_x \\ m_y \\ m_z \end{bmatrix}$ : TORQUE  $\begin{bmatrix} q_x \\ q_y \\ q_z \end{bmatrix}$ : FORCE

METHOD OF CONTROLLING ROBOT'S COMPLIANCE

BACKGROUND OF THE INVENTION

The present invention relates to methods of controlling an industrial robot compensate for a disturbance in the control of the robot's motion due to a mechanism of the robot's effector.

In order to cause a robot to perform operations such as boring, deburring, and grinding a manufactured site, the robot is required to have high performance which the conventional positioning robot does not have. One of the required performance items is to control a force applied to an object. To this end, the conventional techniques have proposed a method of controlling such force, using hardware, that is, a mechanism which sets rigidity in a robot's effector and a method of controlling such force, using software, that is, a technique which provides mechanical compliance for a robot by control software. Namely, any one of those methods is capable of providing compliance for the robot's effector. The latter method is capable of providing contact force control over the motion of the robot as opposed to the former method. In particular, a method of realizing a mechanical compliance mechanism of multiple degrees of freedom in the robot's effector by utilizing software is described as "virtual compliance control of multiple degree of freedom robot" in Society of Instrument and Control Engineers, Collection of Papers, Vol. 22, No. 3, pp.343–350, March 1986.

The virtual compliance control is characterized in that the mechanical compliance of the robot's effector is set at a desired value for an external force and hence the robot has mechanical compliance for an object.

It is impossible to directly measure the value of an external force required for actual construction of this control system between the robot's effector and the object. Thus, it is usually measured at a robot's wrist between the robot's body and its end effector. It is to be noted that the value of a measured external force to be described in more detail later includes an external force involving a physical parameter of the end effector. It is impossible for the robot to have any mechanical compliance for the object unless (1) the external force involving a physical parameter of the end effector is accurately calculated, and (2) the calculated external force is subtracted from a measured value of the external force to obtain the value of the external force from the genuine object.

In order that the robot is provided mechanical compliance for an object, the measured value of the external force conventionally was taken apart from the weight of the end effector itself as an external force due to the physical parameter of the robot's end effector on the external force.

However, when a rotational body having a mechanically large rotational momentum is set as an end effector, the weight of the above-mentioned end effector itself as well as a gyro moment occurring due to interference of the rotational momentum of the end effector and the robot's momentum must be reflected on the external force in order that the robot has any mechanical compliance for the object.

In the conventional virtual compliance control, no gyro moment has been reflected on the external force. Thus, when a rotational body having a mechanically large rotational momentum is set as an end effector, an external force component of a gyro moment occurring due to interference of the rotational motion and the robot's motion prevails among the external force components, so that an effective control system cannot be constructed as the case may be.

SUMMARY OF THE INVENTION

It is an object of the present invention to provide a method of controlling a robot to provide mechanical compliance for an object even when a rotational body is set as the robot's end effector.

In order to achieve the above object, the present invention applies a virtual compliance control method (to be described later) to a multiple-degrees-of-freedom robot including means for sensing a velocity and means for sensing an external force to thereby set the external force accurately for a kinematic model of a control system constructed during control. That is, a term of an external force of a kinematic model in the control system is set by subtracting a term influenced by the weight of the end effector from a value provided by a mechanism which detects the external force (conventional method) and further by subtracting a term influenced by a gyro moment of the end effector from the result of the subtraction.

According to the present invention, when a rotational body having a mechanically large rotational momentum is set as the end effector, the weight of the end effector itself and a gyro moment occurring due to interference of the rotational momentum of the end effector and the momentum of the robot are reflected on a value provided by the mechanism which detects the external force to thereby construct a control system providing mechanical compliance for an object.

In addition, according to the present invention, a point of contact of an object and a robot's rotational body having a mechanically large rotational momentum set as the robot's end effector is presumed with higher accuracy, if desired without influence of the gyro moment occurring due to interference of the rotational momentum of the end effector and the momentum of the robot.

BRIEF DESCRIPTION OF THE DRAWINGS

FIG. 3 shows an illustrative structure of a kinematic model of an end effector constructed in a controller to explain an inventive method.

DESCRIPTION OF THE PREFERRED EMBODIMENTS

Referring to FIGS. 1–4, an embodiment of the present invention will be described.

Figure 1:
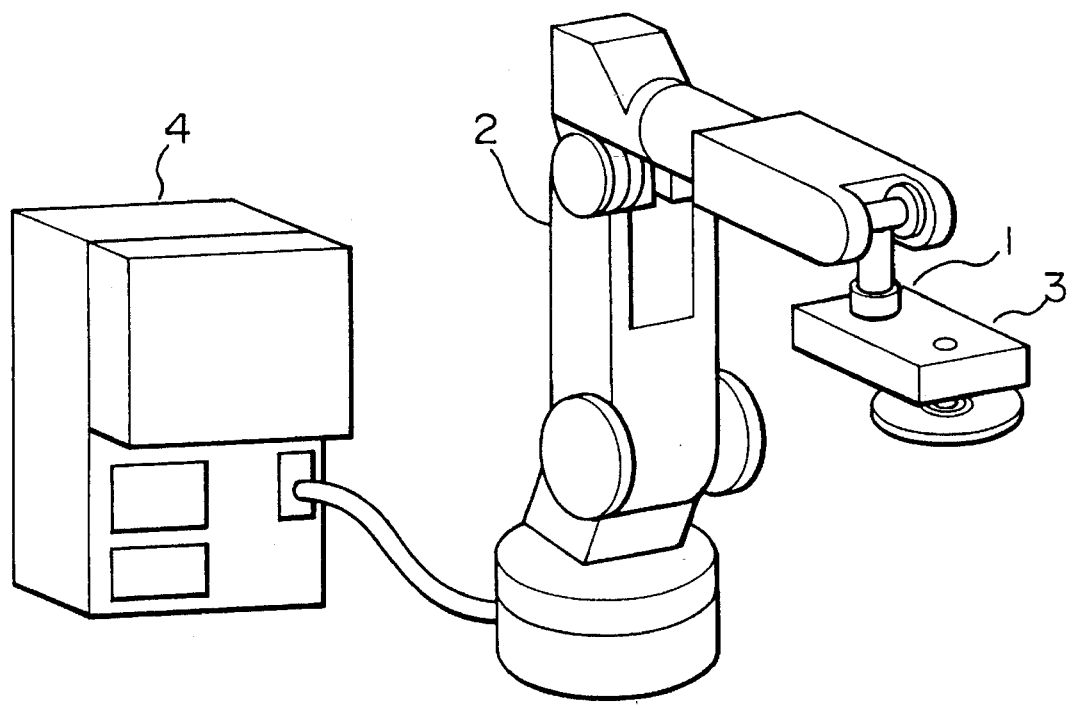
FIG. 1 shows an illustrative structure of a device which carries out the present invention.

Referring to FIG. 1, a 6-degrees-of-freedom articulated robot 2 is provided, at its wrist, with a sensor 1, which senses a 6-degrees-of-freedom force and a torque, and with a grinder 3 attached to an end effector thereof. The robot 2 has attached a sensor which senses the rotational angle or rotational angular velocity at each joint thereof. The robot is controlled by a controller 4 which provides mechanical compliance to the end effector utilizing software. The sensor 1 is not necessarily required to be provided between the robot 2 and the end effector and may be provided between the grinder 3 and a grindstone (not shown). Apart from the sensor 1, a sensor which senses the gyro moment appropriately may be provided on a member which constitutes a part of the robot.

Figure 2:
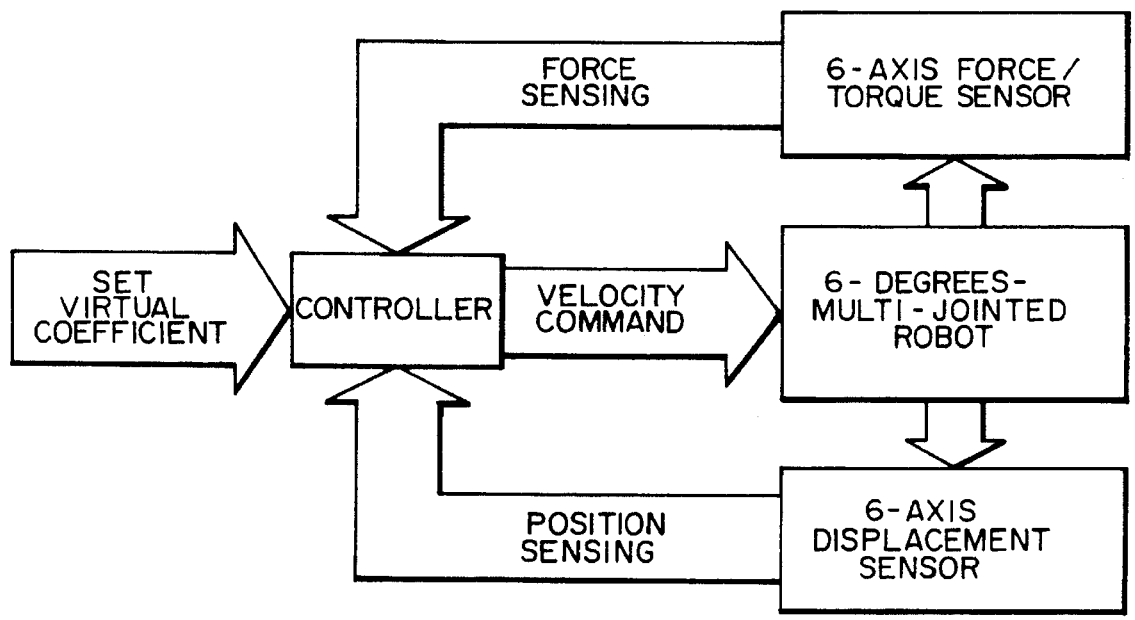
FIG. 2 is a block diagram of a control system of the device.

Referring to FIG. 2, the operator sets in the control system a conditional value called a virtual coefficient to be described later in more detail. The controller extracts thereinto data on the force sensed from the force sensor and position sensed from the joints of the robot and performs an operation on the data. On the basis of the result of this operation, the controller gives a velocity command to the robot to control the robot.

Referring to FIG. 3, the following expression is shown as representing the motion of the end effector:

$$M \frac{d\bar{v}}{dt} = \bar{q} - \bar{k}\bar{e} - C\bar{v} \quad (1)$$

where $\bar{q}$ is an external force deviation to the reference external force (a translational force and a torque) applied to the grinder;

$\bar{v}$ is the motion velocity (translating velocity and rotational velocity) of the grinder;

$\bar{e}$ is an error of the grinder from a target position and a target attitude (positional error and attitude error) of the grinder;

M is a virtual mass of the grinder;

k is a virtual spring constant of the grinder; and

C is a virtual viscous constant of the grinder.

The external force $\bar{q}$ of the above expression may be obtained from the sensor 1 which senses the force and torque. If the tool is required to contact the workpiece with a finite force, the term $\bar{q}$ of the expression (1) is replaced with $\bar{q} - \bar{q}p$.

The value of $\bar{v}$ in the expression (1) may be obtained from a sensor which senses the rotational angle or rotational angular velocity of the joints of robot. When the sensor which senses the rotational angle of the joints of the robot is installed, the rotational angular velocity is obtained by differentiation of the sensed value with respect to time.

The value of $\bar{e}$ in the expression (1) may be obtained from the sensor which senses the rotational angle or the rotational angular velocity of the joints of the robot. When the sensor which senses the rotational angular velocity is installed, the rotational angular velocity is obtained by integration of the sensed values with respect to time.

By appropriate setting of M, K and C of expression (1), any mechanical compliance is obtained for the external force $\bar{q}$ applied to the end effector. The M, K and C are called virtual coefficients.

Since the value of the external force $\bar{q}$ required for actually constructing this control system is measured mechanically at the robot's wrist between the body of the robot 2 and the grinder 3, the obtained value includes an external force due to the physical parameters of the end effector. Thus, the external force q is calculated as follows:

$$\bar{q} = \bar{q}_m - (\bar{q}_g + \bar{q}_i) \quad (2)$$

where $\bar{q}$ is a calculated external force (translational force and torque);

$\bar{q}_m$ is a measured external force (translational force and torque);

$\bar{q}_g$ is an external force (translational force and torque) due to the weight of the end effector; and $\bar{q}_i$ is an external force (translational force and torque) due to a gyro moment acting on a point of grinding in the end effector.

In the conventional virtual compliance control, the term of $\bar{q}_i$ in expression (2) has not been introduced. Thus, when a rotational body having a mechanically large rotational momentum is installed as the end effector, an external force due to a gyro moment caused by interference of the rotational motion of the end effector and the motion of the robot prevails among the components of the calculated external force q. Thus, no effective control system can be constructed as the case may be.

For example, when an object is ground by a grinder provided in the end effector while being supplied with a constant pressing force, the rotation of the grinder and the motion of the robot combine to generate a gyro moment. Thus, the object cannot be conventionally ground while being supplied with the constant pressing force. In contrast, according to the present invention, the object is worked upon while being supplied with a constant pressing force by removal of an external force $q_i$ due to the gyro moment from the external force q, as shown in expression (2).

Figure 4:
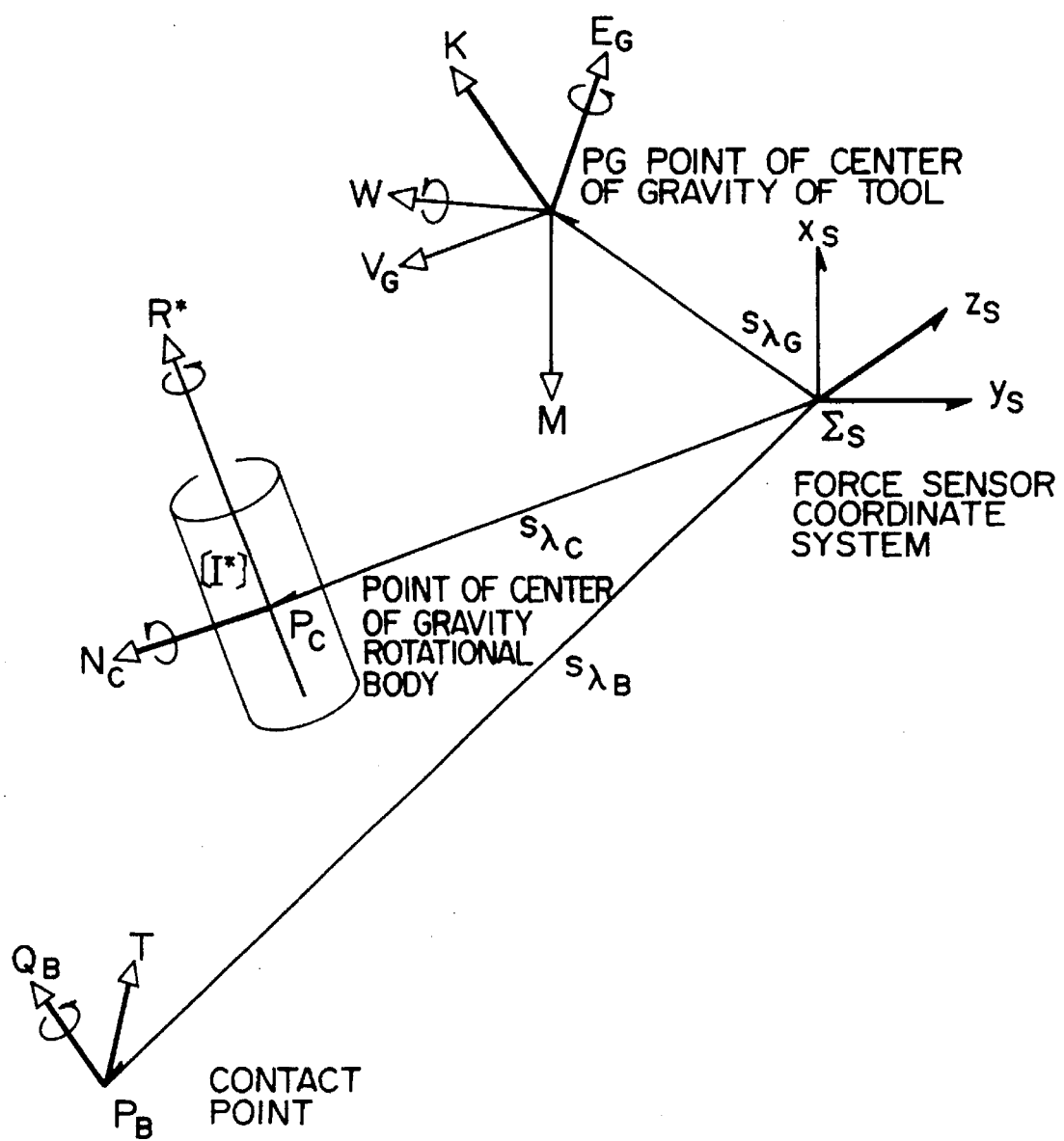
FIG. 4 shows an specific example of a gyro effect related to the present invention.

A method of presuming the external force from the measured value of a force sensor will be described next as a specific example. In the following description, a 6-dimensional vector of a force and a moment is referred to as a wrench. First, in order to advance the description, the definitions of variables of FIG. 4 are shown as follows:

$\Sigma_s$ is the origin of a coordinate system as the point of measurement of the force sensor;

$P_G$ is the point of center of gravity of a tool (including a rotational body);

$P_C$ is the point of center of gravity of a rotational body of the tool;

$P_B$ is the point of contact of the tool and a workpiece;

$_s\lambda_G$ is a position vector at $P_G$ expressed by $\Sigma_s$;

$_s\lambda_C$ is a position vector at the origin of $P_C$ expressed by $\Sigma_s$;

$_s\lambda_B$ is a position vector at the origin of $P_B$ expressed by $\Sigma_s$;

$E_G$ is a moment of inertia caused at $P_G$ by the motion of the tool (including the rotational body);

K is an inertial force caused at $P_G$ by the motion of the tool (including the rotational body);

M is gravity (including a rotational body);

W is the rotational speed of a change in the attitude of the tool;

$V_G$ is a translational velocity at $P_G$;

T is a force applied from the workpiece due to the contact of the tool and the workpiece;

$Q_B$ is a moment applied to $P_B$ due to the contact of the tool and the workpiece;

$N_C$ is a moment applied to $P_C$ due to the gyro moment of the rotational body;

R* is the rotational speed of the rotational body . . . (since it is a physical quantity of another rigid body, it is discriminated by *);

I* is a tensor of inertia of the rotational body . . . (since it is a physical amount of another rigid body, it is discriminated by *);

$\epsilon$ is a dual number;

e is a strain gauge voltage of the force sensor (6 channels);

$\Gamma$ is a voltage conversion matrix of the force sensor (a 6×6 matrix which converts a voltage to a wrench);

$f_s$ is a force sensed directly from the force sensor;

$m_s$ is a moment sensed directly from the force sensor; and x is an outer product operator.

Since the force sensor is composed of the 6-element strain gauge, a wrench $q_{sens}$ measured from the force sensor is calculated from the following expression (3):

$$q_{sens} = \Gamma e \quad (3)$$

Thus, a presumed term of the external force q is calculated from the following expression (4):

$$q = q_{sens} - (q_{GRAV} + q_{tool}) \quad (4)$$

where $q_{GRAV}$ is a wrench due to the weight of the tool; and $q_{tool}$ is a wrench due to the mechanical characteristic of the tool.

The wrench $q_{tool}$ includes a gyro moment due to a change in the rotational momentum of the tool and an inertial wrench due to an acceleration/deceleration of the operation of the robot. The expression (4) exhibits that the term of the external force is the wrench measured by the force sensor minus the wrench due to the tool.

The wrench $_sF$ acting on the tool whose reference is the origin of $\Sigma_s$ will be calculated next. The moment $N_C$ acting on the tool on the basis of the gyro moment is represented by the following expression (5):

$$N_C = W \times I^* R^* \quad (5)$$

The wrench produced at $P_B$ is represented by the following wrench $_sF_B$ whose reference is the origin of $\Sigma_s$:

$$_sF_B = T + \epsilon(Q_B + {_s\lambda_B} \times T) \quad (6)$$

The wrench produced at $P_C$ is represented by the wrench $_sF_C$ whose reference is the origin of $\Sigma_s$:

$$_sF_C = \epsilon N_C \quad (7)$$

The wrench produced at $P_G$ is represented by the wrench $_sF_G$ whose reference is the origin of $\Sigma_s$:

$$_sF_G = K + M + \epsilon\{E_G + {_s\lambda_G} \times (K+M)\} \quad (8)$$

Thus, the wrench acting on the tool whose reference is the origin of $\Sigma_s$ is represented by a wrench $_sF$ whose reference is the origin of $\Sigma_s$ and consisting of the sum of expressions (6), (7) and (8) as follows:

$$_sF = T + K + M + \epsilon\{Q_B + N_C + E_G + {_s\lambda_B} \times T + {_s\lambda_G} \times (K + M)\} \quad (9)$$

The wrench $_sF$ acting on the tool and the wrench $q_{sens}$ measured from the force sensor are of the same kind of physical quantity. The relationship between the value measured from the force sensor and the expression (9) is sought. The gravity M and the position vector $_s\lambda_G$ of $P_G$ are measured beforehand and known. In the motion of the tool, a change with time in each of the translational velocity $V_G$ at the point of center of gravity of the tool and the rotational speed W of a change in the attitude of the tool is small. Thus, K and $E_G$ which are the inertial wrenches of the tool are sufficiently small compared to other terms and, therefore, negligible. The wrench $q_{sens}$ measured directly from the force sensor is converted to a force $f_S$ and a moment $m_S$ as shown by the following expression (10):

$$q_{sens} = f_s + \epsilon m_S \quad (10)$$

Thus, $_sF$ is expressed as follows:

$$T + M + \epsilon\{Q_B + N_C + E_G + {_s\lambda_B} \times T + {_s\lambda_G} \times M\} = f_s + \epsilon m_S \quad (11)$$

Thus, when the point of contact $_s\lambda_B$ is known, the external force is presumed from the measured value of the force sensor, as shown in the following expressions (12) and (13):

$$T = f_S - M \quad (12)$$

$$Q_B = m_S - (N_C + E_G + {_s\lambda_B} \times T + {_s\lambda_G} \times M) \quad (13)$$

When the external force is known, the point of contact $_s\lambda_B$ may be presumed from the expression (11) as follows. When a grinding operation by the grinder is assumed, the contact of the tool and the workpiece is considered as the contact of a convex curve and a curved surface and hence approximated as point contact. This dynamically implies that a force is transmitted but a moment is not at the point contact. Thus, the moment $Q_B$ due to contact is omittable. Accordingly, when $\delta$ is any constant, the point contact $_s\lambda_B$ is represented by the following expression (14):

$$_s\lambda_B = \frac{(_s\lambda_G \times M + N_C - m_S) \times (f_S - M)}{(f_S - M)^2} + \delta(f_S - M) \quad (14)$$

Since the expression (14) contains any constant $\delta$, the point contact $_s\lambda_B$ cannot be obtained uniquely. Thus, the shape of the tool which is capable of coming into contact with the workpiece as restrictive conditions is used, as shown in the following expression (15):

$$J(_s\lambda_B) = 0 \quad (15)$$

The expression (15) represents the shape of the contactable portion of the tool represented by any vector $_s\lambda$ which is in turn represented by $\Sigma_s$. As an example, when a grinder is used as the tool, it is considered that the grindstone of the grinder is represented by $\Sigma_s$ as a disc in a space. The line of action of the pressing force intersects with the disc only once except when it is contained in the disc. At this time, $\delta$ is obtained and the contact point $_s\lambda_B$ is presumed.

The end effector in the invention is not limited to the grinder. Any means which machines a workpiece by rotation and moves the end effector may be used.

According to the present invention, when a rotational body having a mechanically large rotational momentum is set as an end effector of a robot, a control system providing any mechanical compliance for an object is constructed.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of controlling the compliance of robot having multiple degrees of movement and freedom, said robot including means for sensing a velocity of an end effector and means for sensing an external force to the end effector, said method comprising the steps of: sensing the external force so that the motion of the end effector of said robot may have a proper mechanical compliance against the external force;

calculating an angular momentum of a rotational body provided at the end effector of said robot, a gyro moment occurring at said rotational body due to the motion of said robot, a moment of inertia and rotational velocity of said rotational body and an operating velocity of said robot; and subtracting said gyro moment from the signal of said means for sensing the external force.

2. A method of controlling the compliance of a robot having multiple degrees of movement and freedom, said robot including means for sensing a position of an end effector and means for sensing an external force to the end effector, said method comprising the steps of: sensing the external force so that the motion of the end effector of said robot may have a proper mechanical compliance against the external force;

calculating an angular momentum of a rotational body provided at the end effector of said robot and a gyro moment occurring at said rotational body due to the motion of said robot, a moment of inertia and rotational velocity of said rotational body and an operating velocity of said robot obtained by differentiation of a signal of said means for sensing the position with respect to time; and subtracting said gyro moment from the signal of said means for sensing the external force.

3. A method of presuming an external force applied to an end effector of a robot having multiple degrees of movement and freedom, said robot including means for sensing velocity and means for sensing the external force, wherein a rotational body is provided at the end effector, said method comprising the steps of:

calculating an angular momentum of said rotational body and a gyro moment occurring at said rotational body due to the motion of said robot, a moment of inertia and rotational velocity of said rotational body and an operating velocity of said robot;

subtracting said gyro moment from the signal of said means for sensing the external force; and calculating the external force applied to said end effector from the positional relation between the contacting point of the subtracted signal and the external force applied to said end effector and said means for sensing the external force.

4. A method of presuming a point of contact between an end effector of a robot having multiple degrees of movement and freedom, said robot including means for sensing velocity and means for sensing the external force, and an object, wherein a rotational body is provided at the end effector, said method comprising the steps of:

calculating an angular momentum of said rotational body and a gyro moment occurring at said rotational body due to the motion of said robot, a moment of inertia and rotational velocity of said rotational body and an operating velocity of said robot; and subtracting said gyro movement from the signal of said means for sensing the external force; and calculating the point of contacts by utilizing the subtracted signal and information of the form of the end effector.

* * * * *